United States Patent
Miyan et al.

(10) Patent No.: US 9,270,174 B2
(45) Date of Patent: Feb. 23, 2016

(54) INTEGRATED CIRCUIT POWER MANAGEMENT MODULE

(71) Applicants: Lalit Mohan Singh Miyan, Distt Dhaziabad (IN); Kumar Abhishek, Ghaziabad (IN); Nitin Singh, New Delhi (IN)

(72) Inventors: Lalit Mohan Singh Miyan, Distt Dhaziabad (IN); Kumar Abhishek, Ghaziabad (IN); Nitin Singh, New Delhi (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 542 days.

(21) Appl. No.: 13/892,293

(22) Filed: May 12, 2013

(65) Prior Publication Data

US 2014/0333133 A1    Nov. 13, 2014

(51) Int. Cl.
*H02J 3/14* (2006.01)
*H02M 3/157* (2006.01)
*H02M 3/156* (2006.01)

(52) U.S. Cl.
CPC ...... *H02M 3/157* (2013.01); *H02M 2003/1566* (2013.01); *Y10T 307/406* (2015.04)

(58) Field of Classification Search
CPC .................... H03K 2217/0036; Y04S 20/225; H02M 1/08
See application file for complete search history.

(56) References Cited

U.S. PATENT DOCUMENTS

| | | | |
|---|---|---|---|
| 5,764,467 A | 6/1998 | Seo | |
| 5,969,529 A * | 10/1999 | Eiraku | G01R 31/3648 320/136 |
| 6,031,362 A | 2/2000 | Bradley | |
| 6,646,426 B2 | 11/2003 | Terashi | |
| 7,071,665 B2 | 7/2006 | Tzeng | |
| 7,471,072 B2 | 12/2008 | Fogg | |
| 2001/0019499 A1* | 9/2001 | Ishibashi | B82Y 10/00 365/182 |
| 2003/0174226 A1 | 9/2003 | Ahn | |
| 2004/0120445 A1* | 6/2004 | Burns | G06F 1/305 377/27 |
| 2008/0062779 A1* | 3/2008 | Sumita | G06F 9/30141 365/189.16 |
| 2009/0066308 A1 | 3/2009 | Fogg | |
| 2012/0200331 A1 | 8/2012 | Karlsson | |

FOREIGN PATENT DOCUMENTS

EP    1714529 B1    4/2011

* cited by examiner

*Primary Examiner* — Jared Fureman
*Assistant Examiner* — Rafael Pacheco
(74) *Attorney, Agent, or Firm* — Charles E. Bergere

(57) ABSTRACT

An integrated circuit includes a set of electronic circuits, a voltage regulator, and a power management module. The power management module includes a set of dummy circuits connected to the set of electronic circuits, a control signal generator, a counter and a shift register. The control signal generator generates a control signal based on the current consumption of the set of electronic circuits dropping below a threshold value over a predefined period of time. The counter generates a count signal for a predetermined time period when the control signal is activated. The shift register receives the count signal, enables the dummy circuits when the count signal is received, and disables the dummy circuits in a daisy chain fashion during the predetermined time period.

12 Claims, 2 Drawing Sheets

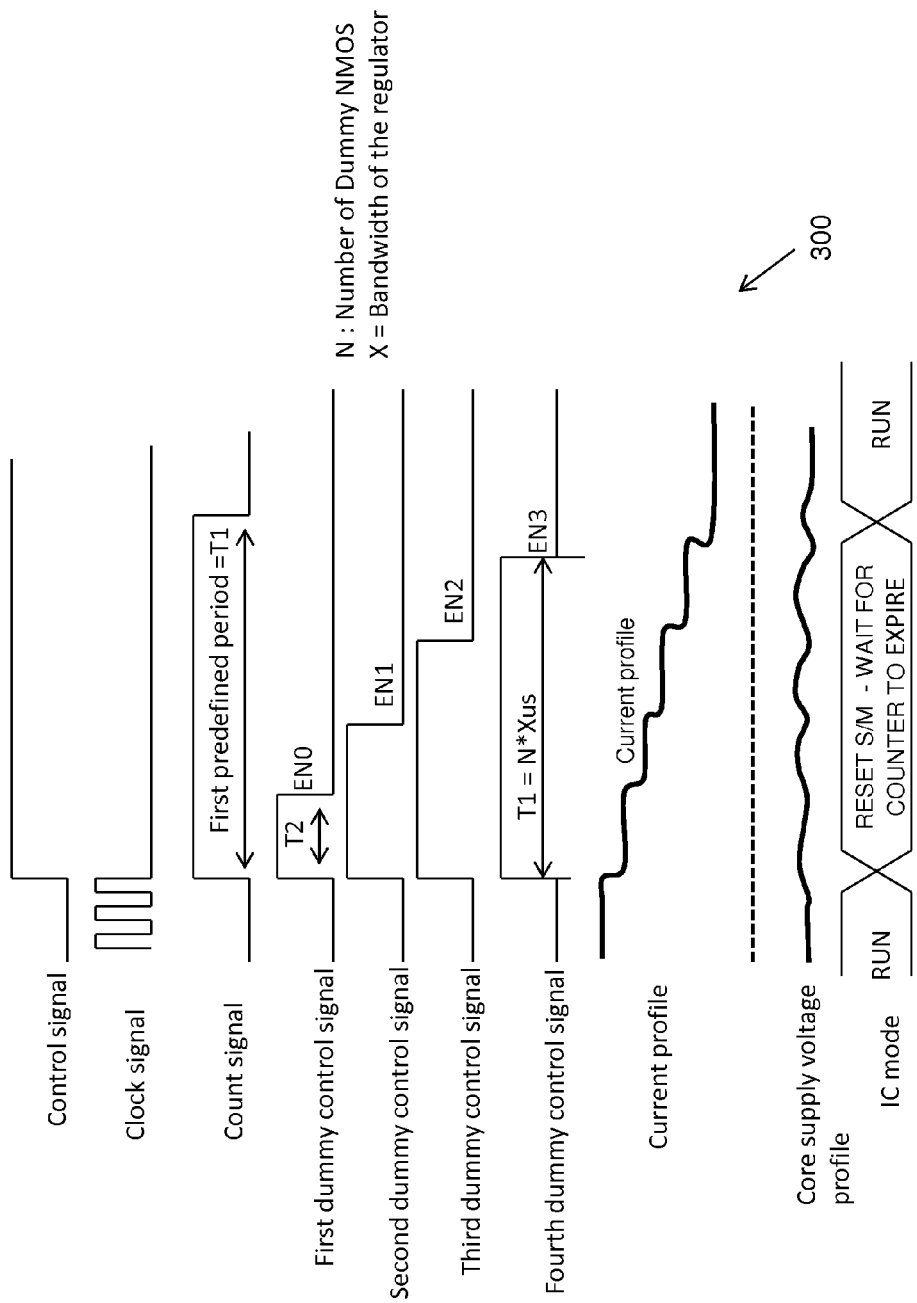

//, US 9,270,174 B2

INTEGRATED CIRCUIT POWER MANAGEMENT MODULE

BACKGROUND OF THE INVENTION

The present invention relates generally to integrated circuits, and more particularly, to a power management module for an integrated circuit.

Integrated circuits (IC) include power supplies that provide different supply voltages to internal circuits of the IC. ICs further operate in different power modes including RUN, STOP, and STANDBY modes. A power supply also regulates the voltage and includes voltage regulator(s) for regulating the supply voltage to the internal circuits in the different modes of operation.

Switched mode power supplies (SMPS) are frequently used in ICs. An SMPS includes a switching regulator for providing a regulated supply voltage to the internal circuits. The switching regulator typically is designed to operate in a low bandwidth range (of the order of 100 KHz) as low bandwidth regulators are power efficient and cost-effective. However, such regulators often fail to sustain a sharp fall in current load of the IC that may occur, for example, due to partial/complete disabling of the IC, or transition of the IC from RUN to STOP/STANDBY modes. In such cases, the low bandwidth regulators prompt the IC to undergo a high voltage detect (HVD) reset due to slow response to the sudden changes in the current.

The IC is rebooted in the event of a HVD reset, which affects the system state and can lead to loss of critical data and time. In systems such as automotive systems, system state is critical and preferable not to lose system state due to frequent resets.

One solution to tackle the above-mentioned problem is to design a switching regulator that can sustain a sharp decrease in current consumption. One such conventional switching regulator includes a voltage detector and a signal generator. The voltage detector monitors the regulated supply voltage and the signal generator adjusts the duty cycle of the switching regulator if the regulated supply voltage increases beyond a predetermined threshold voltage. However, this switching regulator consumes a large area due to the additional circuitry required.

Therefore, it would be advantageous to have a power management module that efficiently regulates voltage in an integrated circuit, prevents the IC from a reset caused by sudden changes in current load, preserves system critical data, has a small area footprint, and generally overcomes the above-mentioned limitations of existing power management modules.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements. It is to be understood that the drawings are not to scale and have been simplified for ease of understanding the invention.

FIG. 3 is a timing diagram illustrating a plurality of control signals generated by the power management module of FIG. 1 in accordance with an embodiment of the present invention.

DETAILED DESCRIPTION OF THE PRESENT INVENTION

Figure 1:
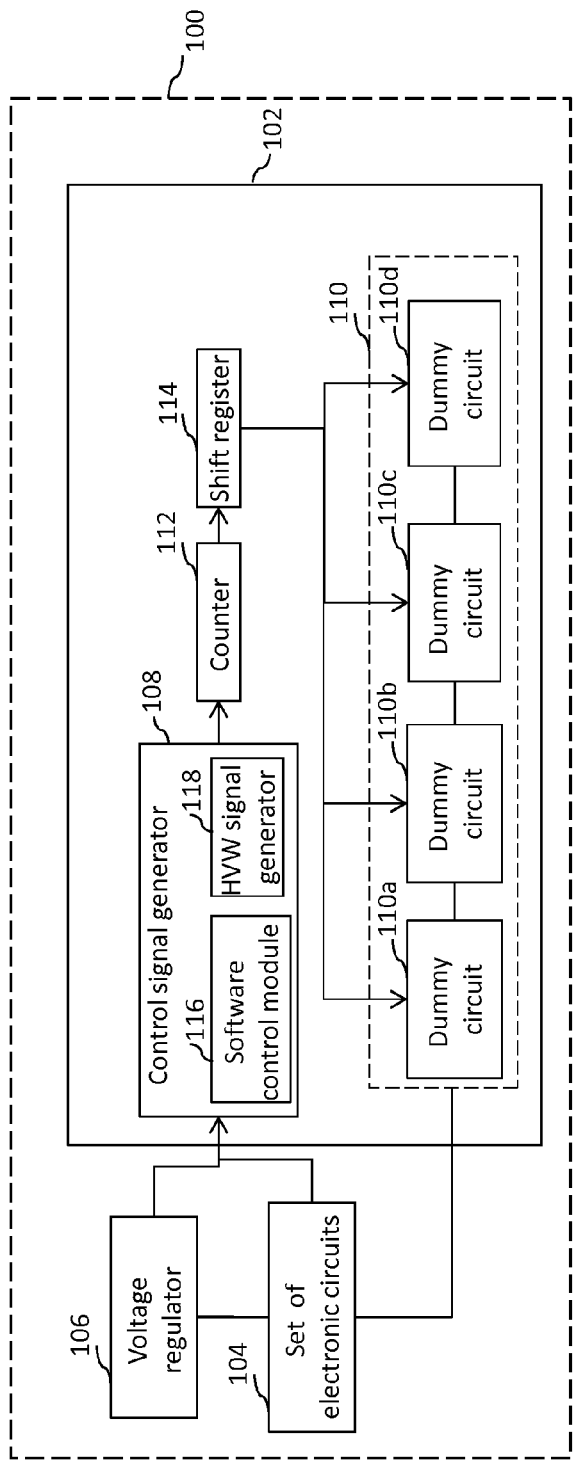
FIG. 1 is a schematic block diagram of an integrated circuit that includes a power management module in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, an integrated circuit is provided that includes a set of electronic circuits, a voltage regulator connected to the set of electronic circuits, and a power management module, connected to the set of electronic circuits and the voltage regulator. The voltage regulator receives an input supply voltage from an input power supply and provides a core supply voltage to the set of electronic circuits. The power management module includes a set of dummy circuits connected to the set of electronic circuits, a control signal generator, a counter and a shift register. The control signal generator generates a control signal if the current consumption of the set of electronic circuits drops below a predetermined threshold value over a first predetermined time period. The counter is connected to the control signal generator and generates a count signal for a second predetermined time period when the control signal is activated. The shift register is connected to the counter and the set of dummy circuits, and receives the count signal, enables the set of dummy circuits concurrently when the count signal is received, and disables the set of dummy circuits in a daisy chain fashion during the second predetermined time period. Enabling and then disabling the dummy circuits prevents a sharp change in current consumption and thus voltage, which prevents a high voltage detection signal from being generated and a corresponding reset occurring.

In another embodiment of the present invention, an integrated circuit is provided that includes a set of electronic circuits, a voltage regulator connected to the set of electronic circuits, and a power management module connected to the set of electronic circuits and the voltage regulator. The voltage regulator receives an input supply voltage from an input power supply and provides a core supply voltage to the set of electronic circuits. The power management module includes a set of dummy n-type metal oxide semiconductor (NMOS) transistors, a control signal generator, a counter and a shift register. Each dummy NMOS transistor has a gate terminal, a source terminal connected to ground, and a drain terminal connected to output of the voltage regulator for receiving the core supply voltage. A control signal generator generates a control signal when the current consumption of the set of electronic circuits drops below a predetermined threshold value over a first predetermined time period. The counter is connected to the control signal generator and generates a count signal for a second predetermined time period when the control signal is activated. The shift register is connected to the counter and the gate terminals of the dummy NMOS transistors, and receives the count signal, and generates a set of dummy control signals for enabling the dummy NMOS transistors concurrently when the count signal is received, and disabling the dummy NMOS transistors in a daisy chain fashion during the second predetermined time period. Enabling and then disabling the dummy transistors prevents a sharp change in current consumption and thus voltage, which prevents a high voltage detection signal from being generated and a corresponding reset occurring.

Various embodiments of the present invention provide an IC with a power management module. The IC includes a set of electronic circuits and a voltage regulator. The power management module includes dummy circuits connected to corresponding electronic circuits. The dummy circuits are enabled concurrently based on a control signal generated by the power management module when the current consumption of the electronic circuits drops below a predetermined threshold value over a first predefined period of time. Thereafter, the dummy circuits are disabled in a daisy chain fashion during a second predetermined time period. The dummy circuits are enabled when there is an indication of a sharp decrease in current consumption of the electronic circuits. The concurrent enabling and daisy chain disabling of the dummy circuits allows the overall current consumption of the IC to decrease gradually in steps and prevents the IC from undergoing a high voltage detect (HVD) reset, thereby preserving system critical data. The power management module further has a small area footprint (does not require a voltage detector and a signal generator) and prevents the IC from a reset caused by sharp decrease in current consumption without modifying the voltage regulator.

Referring now to FIG. 1, a schematic block diagram of an integrated circuit (IC) 100 that includes a power management module 102, in accordance with an embodiment is shown. Examples of the IC 100 may include a microcontroller unit (MCU), a system-on-chip (SoC), or an application specific integrated circuit (ASIC). The IC 100 is capable of operating in various modes such as RUN, STOP, and STANDBY modes. The RUN mode is a high power mode and the STOP and STANDBY modes are low power modes. The IC 100 includes a set of electronic circuits 104, which may be digital or analog, or a combination thereof (i.e., mixed signal circuits).

A voltage regulator 106 is connected to the electronic circuits 104 and receives an input supply voltage from an input power supply (not shown) and provides a core supply voltage to the electronic circuits 104. An example of the voltage regulator 106 is a switching regulator, which is typically used by a switched mode power supply (SMPS), and is known to those of skill in the art. The power management module 102 is connected to the electronic circuits 104 and the voltage regulator 106 and includes a control signal generator 108, a set of dummy circuits 110, a counter 112 and a shift register 114.

The control signal generator 108 generates a control signal when the current consumed by the electronic circuits 104 drops below a predetermined threshold value over a predefined period of time. For example, the current consumption of the electronic circuits 104 may drop sharply when the electronic circuits 104 are partially or completely disabled, or when the IC 100 transitions from the RUN mode to the STOP or STANDBY modes. The control signal generator 108 includes a software control module 116 that generates the control signal when a request for partially/completely disabling the electronic circuits 104 or transitioning the IC 100 into the STOP/STANDBY mode is generated either internally or externally.

Further, the core supply voltage may rise sharply and cause a high voltage detect (HVD) voltage, which causes the IC 100 to undergo a HVD reset when the current consumption of the electronic circuits 104 drops. The control signal generator 108 includes a high voltage warning (HVW) signal generator 118 that generates the control signal when the core supply voltage increases beyond a predetermined threshold voltage (less than the HVD voltage). That is, the HVW signal generator 118 generates the control signal when there is a possibility of the IC 100 undergoing an HVD reset due to a sharp drop in the current consumption of the electronic circuits 104.

The set of dummy circuits 110 is connected to the electronic circuits 104 and in the embodiment shown includes first, second, third and fourth dummy circuits 110a, 110b, 110c and 110d respectively. The set of dummy circuits 110 are idle (non-operational) during normal operation of the IC 100 and are enabled only when the control signal is generated in order to prevent the IC 100 from undergoing a reset. Preferably the set of dummy circuits 110 is integrated with the electronic circuits 104 in order to occupy very little area. Although four dummy circuits (110a, 110b, 110c and 110d) are shown, it will be apparent to those skilled in the art that the set of dummy circuits 110 may include more or fewer dummy circuits.

The counter 112 is connected to the control signal generator 108 and generates a count signal for a first predetermined time period when the control signal is generated. The shift register 114 is connected to the counter 112 and the set of dummy circuits 110. The shift register 114 receives the count signal, and generates first through fourth dummy control signals for controlling corresponding first through fourth dummy circuits 110a-110d, respectively. That is, the first through fourth dummy control signals enable the respective first through fourth dummy circuits 110a-110d substantially simultaneously when the count signal is received, and disable the dummy circuits 110a-110d in a daisy chain fashion during the first predetermined time period.

Figure 2:
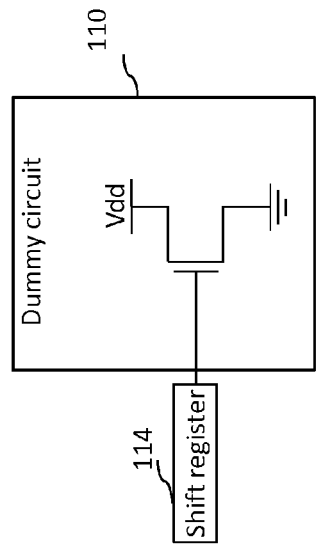
FIG. 2 is a schematic block diagram of a dummy circuit in accordance with an embodiment of the present invention.

FIG. 2 is a schematic block diagram of an exemplary dummy circuit of the set of dummy circuits 110. The dummy circuit 110 includes an n-type metal oxide semiconductor (NMOS) transistor that has a gate terminal connected to an output of the shift register 114 for receiving the first dummy control signal, a source terminal connected to ground, and a drain terminal connected to the output of the voltage regulator 106 for receiving the core supply voltage.

FIG. 3 is a timing diagram 300 of the control signal, a clock signal, the count signal, first through fourth dummy control signals, a current profile of the IC 100, a core supply voltage profile, and a mode of operation of the IC 100. The operation of the power management module 102 will be explained below with reference to the timing diagram 300.

The control signal generator 108 generates a control signal (a logic high signal) when the IC 100 exits the RUN mode and the current consumption of the set of electronic circuits 104 drops sharply. Simultaneously, the clock of the IC 100 shuts down, and the counter 112 generates a count signal for the first predetermined time period T1. The first predetermined time period T1 is based on a bandwidth X of the voltage regulator 106, and a depth N of the set of dummy circuits 110, and corresponds to an approximate time period required by the voltage regulator 106 to respond to changes in current consumption of the electronic circuits 104. N (depth) is the number of dummy circuits 110 (e.g., depth is 4 for the IC 100). The depth is set based on a total current consumption of the electronic circuits 104 and current consumption of each dummy circuit 110. For example, when the current consumption of the electronic circuits 104 and a dummy circuit 110 is 100 mA and 10 mA respectively, a recommended depth is 10. In another example, when the current consumption of the electronic circuits 104 and a dummy circuit 110 is 200 mA and 10 mA respectively, the recommended depth is 20.

Upon generation of the count signal, the shift register 114 generates first, second, third and fourth dummy control signals EN0, EN1, EN2, and EN3 for controlling the first second, third and fourth dummy circuits 110a, 110b, 110c, and 110d respectively. The first through fourth dummy control signals EN0-EN3 are high active and enable respective dummy circuits 110a, 110b, 110c, and 110d, in multiples of the second predetermined time period T2. The first dummy control signal EN0 transitions from high to low at the end of the second predetermined time period T2 and when low, disables the first dummy circuit 110a. The second dummy control signal EN1 transitions from high to low at the end of two periods of the second predetermined time period (2T2) and when low, disables the second dummy circuit 110b. The third dummy control signal EN2 transitions from high to low at the end of three periods of the predetermined time period (3T2) and when low, disables the third dummy circuit 110c. Finally, the fourth dummy control signal EN3 transitions from high to low at the end of four periods of the second predetermined time period (4T2) and when low, disables the fourth dummy circuit 110d. Thus, the dummy circuits 110 are disabled in a daisy chain fashion, where there is a gap equal to the second predetermined time period T2 between the disabling of the dummy circuits, spread over the first predetermined time period T1. At the end of the first predetermined time period T1, the electronic circuits 104 and the dummy circuits 110 both are disabled.

The current profile represents current consumption of the IC 100. When the IC 100 exits the RUN mode, the current consumption of the electronic circuits 104 drops sharply. However, the current consumption of the IC 100 decreases gradually in steps rather than decreasing sharply because of the simultaneous enabling of the dummy circuits 110 and then disabling them in daisy chain fashion. When the current consumption decreases gradually, the voltage regulator 106 has enough time to respond to changes in the current and maintains an steady core supply voltage (illustrated by the core supply voltage profile) to prevent a HVD reset.

In various embodiments of the present invention, the second predetermined time period T2 corresponds to the response time of the voltage regulator 106 and is usually in the range of 5 to 10 micro seconds (µs). The first predetermined time period T1 is a multiple of the second predetermined time period T2 and depends on the depth N of the dummy circuits 110 and magnitude of the current load transition.

While particular embodiments of the present invention have been shown and described, it will be recognized to those skilled in the art that, based upon the teachings herein, further changes and modifications may be made without departing from this invention and its broader aspects. For example, where signals are described as low active, it is understood that high active signals could be used and vice-versa. Thus, the appended claims are to encompass within their scope all such changes and modifications as are within the true spirit and scope of this invention.

The invention claimed is:

1. An integrated circuit, comprising:
a set of electronic circuits;
a voltage regulator, connected to the set of electronic circuits, for providing a core supply voltage to the set of electronic circuits; and
a power management module, connected to the set of electronic circuits and the voltage regulator, wherein the power management module includes:
a set of dummy circuits connected to the set of electronic circuits;
a control signal generator that generates a control signal based on the current consumption of the set of electronic circuits dropping below a threshold value over a first predetermined time period;
a counter, connected to the control signal generator, that generates a count signal for a second predetermined time period when the control signal is activated; and
a shift register, connected to the counter and the set of dummy circuits, that receives the count signal, enables the set of dummy circuits substantially simultaneously when the count signal is received, and disables the set of dummy circuits in a daisy chain fashion during the second predetermined time period, wherein enabling and then disabling the dummy circuits prevents a sharp change in current consumption, which prevents a high voltage detection signal from being generated and a corresponding reset occurring.

2. The integrated circuit of claim 1, wherein the second predetermined time period is based on a bandwidth of the voltage regulator and a depth of the set of dummy circuits.

3. The integrated circuit of claim 2, wherein the depth of the set of dummy circuits is based on a total current consumption of the set of electronic circuits and current consumption of each dummy circuit.

4. The integrated circuit of claim 1, wherein each dummy circuit of the set of dummy circuits includes an n-type metal oxide semiconductor (NMOS) transistor having a gate terminal connected to an output of the shift register, a source terminal connected to ground, and a drain terminal connected to an output of the voltage regulator.

5. The integrated circuit of claim 1, wherein the shift register generates a set of dummy control signals to enable and disable the set of dummy circuits.

6. The integrated circuit of claim 1, wherein the shift register disables the set of dummy circuits in the daisy chain fashion with a gap of a third predetermined time period.

7. The integrated circuit of claim 1, wherein the control signal generator comprises a high voltage warning (HVW) signal generator that generates the control signal when the core supply voltage increases beyond a predetermined threshold voltage.

8. An integrated circuit, comprising:
a set of electronic circuits;
a voltage regulator, connected to the set of electronic circuits, for providing a core supply voltage to the set of electronic circuits; and
a power management module, connected to the set of electronic circuits and the voltage regulator, wherein the power management module includes:
a set of dummy n-type metal oxide semiconductor (NMOS) transistors, each having a gate terminal, a source terminal connected to ground, and a drain terminal connected to an output of the voltage regulator for receiving the core supply voltage;
a control signal generator that generates a control signal based on a current consumption of the set of electronic circuits dropping below a threshold value over a first predetermined time period;
a counter, connected to the control signal generator, that generates a count signal for a second predetermined time period when the control signal is generated; and
a shift register, connected to the counter and the gate terminals of the set of dummy NMOS transistors, that receives the count signal and generates a set of dummy control signals for enabling the set of dummy NMOS transistors substantially simultaneously when the count signal is received, and disabling the set of dummy NMOS transistors in a daisy chain fashion during the second predetermined time period.

9. The integrated circuit of claim 8, wherein the second predetermined time period is based on a bandwidth of the voltage regulator and a depth of the set of the dummy NMOS transistors.

10. The integrated circuit of claim 9, wherein the depth of the set of dummy NMOS transistors is based on a total current consumption of the set of electronic circuits and the current consumption of each dummy NMOS transistor.

11. The integrated circuit of claim 8, wherein the shift register disables the set of dummy NMOS transistors in the daisy chain fashion with a gap of a third predetermined time period.

12. The integrated circuit of claim 8, wherein the control signal generator includes a high voltage warning (HVW) signal generator that generates the control signal when the core supply voltage increases beyond a predetermined threshold voltage.

\* \* \* \* \*